3,205,177
SURFACE TREATED METAL OXIDE POLYMERIZATION CATALYSTS AND METHOD OF PREPARATION
Adam Orzechowski, Waltham, and James C. MacKenzie, Wellesley Hills, Mass., assignors to Cabot Corporation, Boston, Mass., a corporation of Delaware
No Drawing. Filed Sept. 10, 1963, Ser. No. 307,786
26 Claims. (Cl. 252—429)

This application is a continuation-in-part of copending application Serial No. 15,815, filed March 18, 1960, by Adam Orzechowski and James C. MacKenzie, now abandoned.

This invention relates to novel polymerization catalysts and catalyst components and to a process for producing polymerization catalyst components.

A copending application, Serial No. 300,049, filed August 5, 1963, by Yancey and MacKenzie, which application is a continuation-in-part of Serial No. 197,231, filed May 24, 1962, and now abandoned, discloses a process for producing novel ion exchange materials by reacting an alkali metal or certain alkali metal compounds with hydroxyl groups on the surface of certain inorganic oxides.

It has also been disclosed, for example, in the aforementioned copending U.S. patent application of Adam Orzechowski and James C. MacKenzie that inorganic solids bearing chemically combined on the surface thereof, surface structures conforming to the formula $$ZO_aX_b$$

wherein Z is a metal of Group VIIa; O is oxygen; $a$ is a number from 0 to 1; each X is any halogen; $b$ is a number from 1 to 5; and wherein said structures are chemically linked directly from Z to at least one oxygen atom in the surface of said inorganic solid comprise superior catalyst components which, when combined with suitable organometallic compounds, produce superior polymerization catalysts.

In accordance with said patent application of Orzechowski and MacKenzie, said catalyst components are produced by reacting a Group VIIa metal halide or oxyhalide (hereinafter for the sake of brevity collectively referred to as "Group VIIa halides") with hydroxyl groups on the surface of a finely-divided inorganic solid as is illustrated in the following equation in which manganese hexachloride represents the Group VIIa halide, and silica represents the inorganic solid bearing hydroxyl groups on the surface thereof:

EQUATION 1

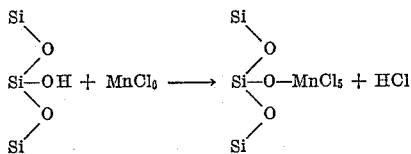

In said method of making said catalyst components, the gaseous by-product of the above reaction, i.e. hydrogen halide, should be removed from the reaction medium in order to produce a catalyst component of reproducible character and performance. Secondly, the kinetics of the above reaction are such that considerable time and heat energy are normally required in the efficient formation of said catalyst component. In accordance with the present invention, however, by-products which need be removed are often not produced and formation of said catalyst components is normally more readily achieved.

Accordingly, it is a principal object of the present invention to provide novel catalyst components.

It is another object of the present invention to provide novel polymerization catalysts.

It is another object of the invention to provide an improved process for producing novel catalyst components.

Other objects of the present invention will in part be obvious and will in part appear hereinafter.

It has been discovered that said catalyst components are produced in a relatively short time by reacting (a) catalyst component intermediates comprising a reaction product of the type produced by reacting, as disclosed in detail in U.S. Serial No. 300,049, hydroxyl groups on the surface of a finely-divided inorganic solid and an alkali metal or certain alkali metal compounds with (b) a Group VIIa halide.

Inorganic solids suitable for the purposes of the present invention generally include any relatively inert solid having at least about $1 \times 10^{-4}$, and preferably at least about $5 \times 10^{-4}$, equivalents per gram of hydroxyl groups on the surface thereof and an average particle diameter of less than about 0.1, and preferably less than about 0.05 micron. For example, metal oxides such as titania, zirconia, thoria, magnesia and silica, silicates such as chrysotile, actinolite and crocidolite, and aluminates such as corundum and bauxite are all generally suitable for the purposes of the present invention provided the surface hydroxyl group concentration and the particle size are appropriate.

It is pointed out, however, that the alkali metals and alkali metal compounds of the present invention are relatively strong reducing agents. Accordingly, when an inorganic solid is utilized which is reducible, for example titanium dioxide, it is extremely important that the quantity of alkali metal or alkali metal compound reacted therewith not exceed that quantity stoichiometrically necessary to react with all the hydroxyl groups on the surface of the solid. While said stoichiometric quantity should not be exceeded even when a non-reducible inorganic solid is utilized it is particularly important, for obvious reasons, to avoid an excess when a reducible solid is utilized. On the other hand, it is generally desirable to add no less than said stoichiometric quantity as any hydroxyl groups left unreacted can subsequently detrimentally affect the performance of the catalyst formed by combining the catalyst component produced with an organometallic compound.

The alkali metals, by which is meant lithium, sodium, potassium, rubidium, cesium and francium, in metallic form are all generally suitable for the purposes of the present invention. In addition, alkali metal compounds conforming to the empirical formula M'R wherein M' is an alkali metal and R is chosen from the group consisting of any monovalent hydrocarbon radical and hydrogen are suitable for the purposes of the present invention.

Specific examples of R groups for substitution in the above formula include methyl, ethyl, n-propyl, isobutyl, n-amyl, isoamyl, hexyl, n-octyl, n-dodecyl, and the like; 2-butenyl, 2-methyl-2-butenyl, and the like; cyclopentylmethyl; cyclohexylethyl, cyclopentylethyl, methylcyclopentylethyl, 4-cyclohexenylethyl and the like; 2-phenylethyl, α-naphthylethyl, methylnaphthylethyl, and the like; cyclopentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl, and the like; phenylcyclopentyl, phenylcyclohexyl, and the corresponding naphthyl derivatives of cycloalkyl groups, and the like; phenyl, tolyl, xylyl, ethylphenyl, xenyl, naphthyl, methylnaphthyl, dimethylnaphthyl, ethylnaphthyl, and cyclohexylphenyl.

Examples of compounds conforming to the above formula, and which are therefore suitable for the purposes of the present invention, are ethyllithium, hexyllithium, cyclopentadienylsodium, octylpotassium, butyllithium, sodium hydride, cesium hydride and rubidium hydride. Moreover, complexed compounds which conform to the above empirical formula, such as diphenyldilithium and diphenylpotassium lithium are also generally suitable for the purposes of the present invention.

The conditions under which reaction between the alkali metal or alkali metal compound and hydroxyl groups on the surface of the finely-divided solid can be accomplished in order to produce a catalyst component intermediate are subject to considerable variation. However, in order to obtain a catalyst component intermediate with reproducible character and performance, it has been found to be *all important* that the finely-divided solid be essentially dry and anhydrous (i.e. free of molecular water in any form) at the time it is brought into contact with the alkali metal or alkali metal compound. When the finely-divided solid to be utilized contains molecular water in any form and/or tends to absorb same on exposure to humid atmospheres, etc., it must be dried immediately before use, or after drying must be maintained continuously out of contact with water vapor until utilized. If the precaution of using a substantially anhydrous finely-divided solid is not observed, the desired chemical reaction either does not occur at all or does not predominate to the extent necessary to produce a superior catalyst component intermediate. Instead, products are obtained which are very inferior as catalyst component intermediates in that the concentration of alkali metal present on the surface of the particulate solid is reduced due to reaction of the alkali metal or alkali metal compound with moisture.

In the case of the alkali metal compounds conforming to the formula M'R the reaction is preferably accomplished by contacting the finely-divided solid with a solution or a good dispersion of the alkali metal compound in an inert hydrocarbon reaction medium, and maintaining the two reactants in intimate contact for a period of time sufficient to effect the desired metathetical chemical reaction resulting in the chemical bonding of the alkali metal to the finely-divided solid. The length of time required to effect a given amount of such reaction and chemical bonding is largely dependent upon the temperature.

Generally speaking, any temperature between about $-10°$ C. and about $125°$ C. can be used satisfactorily, but room temperature or higher will generally be used. Assuming provision is made for intimate contact of the dry, finely-divided solid and the alkali metal compound, the minimum time required to accomplish the chemical reaction needed will vary to some extent with the temperature utilized, i.e. the higher the temperature utilized, the shorter the reaction time required. Temperatures substantially higher than about $125°$ C., e.g. $150$–$175°$ C., often cause the decomposition of alkali metal compounds and moreover are completely needless, and therefore of little or no interest.

Various classes of hydrocarbons or their mixtures which are liquid and substantially inert under the reaction conditions of the present process constitute suitable liquid reaction media. Thus, various classes of saturated hydrocarbons such as pure alkanes, cycloalkanes and commercially available mixtures, freed of harmful impurities, are suitable for the purposes of the present invention. For example, straight run naphthas and kerosenes, liquefied alkanes, aromatic hydrocarbons, and particularly the mononuclear aromatic hydrocarbons such as benzene, toluene, xylenes, mesitylene, and xylene-p-cymene mixtures and the like are all completely suitable. Also, ether-type solvents, such as 1,2-dimethoxyethane, and tetrahydrofuran dioxane are useful particularly in cases where the alkali metal compound is insoluble in a true hydrocarbon solvent. Thus, for the purposes of the present invention, ether-type solvents are included within the scope of the term, hydrocarbon solvents.

Although use of the alkali metal compounds in liquid or solution form generally gives excellent results, the reaction of the alkali metal compound with hydroxyl groups on the surface of the finely-divided solid can also be effected if the latter is exposed to sufficient quantities of the vapors of an alkali metal compound under conditions of time and temperature similar to those discussed above. The vapors of many alkali metal compounds can be supplied under their own vapor pressure using a partial vacuum if necessary, or with the aid of a dry, inert carrier gas such as nitrogen. Said vapor phase treatment can be accomplished in any suitable manner such as by circulating the vapors through the particulate solid in a fixed, moving or fluidized bed reactor.

In the case of the alkali metals in metallic form however, reaction with hydroxyl groups on the surface of the finely-divided solid in a hydrocarbon solution is not generally feasible due to the very low solubility of the alkali metals in most hydrocarbon media. On the other hand, reaction of alkali metal vapors with the finely-divided solid is not generally practicable due to the extremely low volatility of the alkali metals. The reactions of alkali metals with the finely-divided solid can, however, be accomplished by reacting in an inert hydrocarbon medium (as specified above) a finely-divided solid and finely comminuted alkali metal. Briefly, a suitable procedure for accomplishing said reaction comprises placing a finely-divided solid and an alkali metal in a hydrocarbon solvent having a boiling point higher than the melting point of the alkali metal, melting the alkali metal by heating the hydrocarbon medium to a temperature above the melting point of the alkali metal but preferably below the boiling point of the hydrocarbon medium, and subsequently comminuting the molten alkali metal, for example, by stirring the hydrocarbon medium with a high speed stirrer. Under these conditions, the alkali metal will react with the hydroxyl groups on the surface of the solid.

The accomplishment of an actual chemical reaction of controlled extent between hydroxyl groups on the surface of the finely-divided solid and the alkali metals or alkali metal compounds is of utmost importance in obtaining catalyst component intermediates of reproducible character and performance because the ultimate catalytic activity of a catalyst component is generally highly dependent upon the amount of alkali metal chemically combined to the surface of a given weight of the finely-divided solid. Accordingly, in preparing the surface reacted finely-divided solids of the present invention, it should be kept in mind that the smaller the average particle size of the solid and the larger the quantity of hydroxyl groups on the surface thereof, the greater will be the potential activity and efficiency of the catalyst component producible therefrom. Therefore, it is important to use as the starting material particulate, finely-divided solids having an average particle diameter of less than about 0.1 micron, and ideally less than about 0.05 micron, and having a hydroxyl group concentration on the surface thereof of at least about $1 \times 10^{-4}$, and preferably at least about $5 \times 10^{-4}$, equivalents per gram of solid.

Although the mechanism of the reaction between the alkali metals or alkali metal compounds and the solid is not completely understood, it is known that the alkali metals and alkali metal compounds react with the hydroxyl groups on the surface of the solid liberating by-products such as the corresponding alkane when an alkali metal alkyl is utilized, or hydrogen when an alkali metal or an alkali metal hydride is utilized. It is believed, although there is no intent to be bound by this explanation, that the reactions which occur are of the type illustrated by the following equations, wherein silica serves as the finely-divided solid and sodium metal, sodium hydride and lithiumbutyl, respectively, serve as the alkali metal reactants:

EQUATION 2

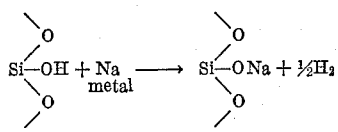

EQUATION 3

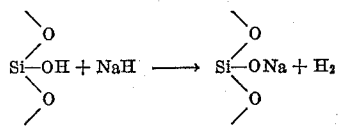

EQUATION 4

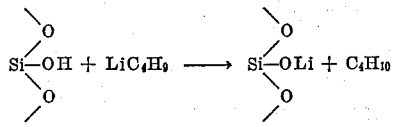

When said alkali metallated solids are reacted with a Group VIIa halide, catalyst components of the type disclosed in U.S. patent application Serial No. 15,815 are produced.

Group VIIa halides and oxyhalides are generally suitable for the purposes of the present invention. Examples of suitable compounds are manganese dichloride, technetium heptachloride and manganese hexachloride.

The conditions under which reaction between the Group VIIa halides and the finely-divided, alkali metallated solids can be accomplished are subject to considerable variation. However, as has been previously stated with regard to the formation of the alkali metallated solids, in order to obtain a catalyst component with exceptionally high activity, and reproducible character and performance, it has been found to be all important that the finely-divided alkali metallated solid be maintained essentially dry and anhydrous (i.e. free of molecular water in any form) prior to as well as at the time it is brought into contact with the Group VIIa halides. Generally, the said reaction can be carried out by contacting said alkali metallated solid with said Group VIIa halides, preferably in a solution thereof in an inert hydrocarbon medium, and maintaining the two reactants in intimate contact for a period of time sufficient to effect the desired chemical reaction resulting in the chemical bonding of the Group VIIa to the solid. The length of time required to effect a given amount of such reaction and chemical bonding is largely dependent upon the temperature of the reaction mixture. Generally speaking, almost any temperature between about $-10°$ C. and about 200° C., and even higher temperatures can be used satisfactorily, but room temperature to about 100° C. is generally preferred. Assuming provision is made for intimate contact of the alkali metallated solid and the Group VIIa halides, the minimum time required to accomplish the chemical reaction will vary from periods of about one hour at about room temperature to periods of about five minutes at temperatures of 100° C. or over. Temperatures substantially higher than about 200° C., e.g. 500° C., are completely needless and therefore of little or no interest.

It is believed that the type of reaction that occurs is correctly illustrated by the following illustrative equation, wherein silica bearing chemically bound lithium on the surface thereof serves as the alkali metallated solid and manganese hexachloride serves as the Group VIIa halide:

EQUATION 5

$$SiOLi + MnCl_6 \rightarrow SiOMnCl_5 + LiCl$$

Also, it is pointed out that in order to obtain a catalyst component of the highest possible activity, aside from observing the above important precautions and reaction conditions, it is also recommended that the quantity of Group VIIa halide with which the solid is contacted be at least approximately sufficient to provide one atom of Group VIIa metal for each three atoms of alkali metal on the surface of the inorganic solid, in order to promote reaction with as many of the alkali metal sites as possible, since any sites left unreacted might tend to affect the performance of the catalyst which will be subsequently produced.

Moreover, it is generally desirable to use somewhat more than this minimum amount of Group VIIa halide and to restrict the reaction temperature in order to favor the reactions illustrated by Equations 6 and 7, rather than those illustrated by Equations 9 and 10, which follow, because the products of Equations 6 and 7 are generally substantially more active as catalyst components than are the products of Equations 9 and 10:

EQUATION 6

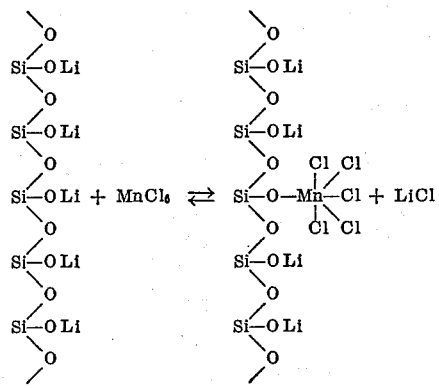

EQUATION 7

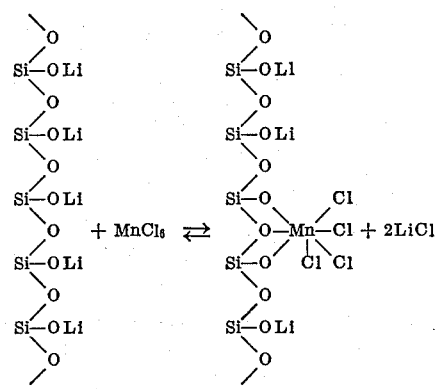

EQUATION 8

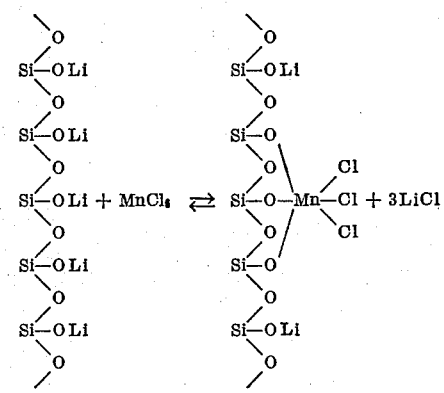

EQUATION 9

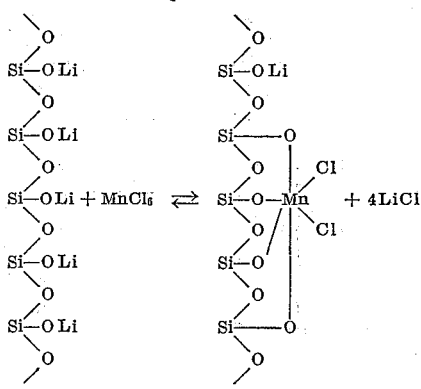

EQUATION 10

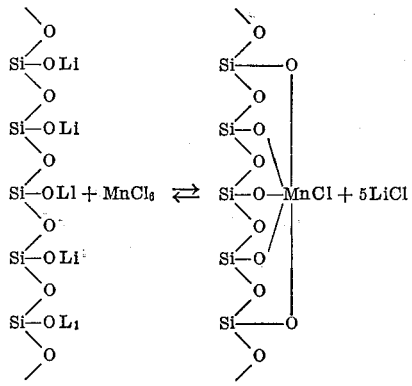

On the other hand, if more Group VIIa halide is introduced than will react, the excess is preferably removed before formation of the catalyst. Although the excess can be removed by extraction, it is obviously more desirable to avoid such additional steps.

In order to form the catalyst of the present invention, the cocatalyst is combined with a suitable organometallic compound. Suitable organometallic compounds are any of the compounds conforming to the general formula:

$$MM'_v X_n R_y$$

wherein M is a metal chosen from Groups I, II and III of the periodic table; M' is a metal of Group I of the periodic table; $v$ is a number from 0 to 1; each X is a halogen; $n$ is a number from 0 to 3; each R is any monovalent hydrocarbon radical or hydrogen; $y$ is a number from 1 to 4;

Compounds of a single Group I, II or III metal which are suitable for the practice of the invention include compounds conforming to the subgeneric formula:

$$M(R')_k$$

wherein M is a Group I, II or III metal, such as lithium, sodium, beryllium, barium, boron, aluminum, copper, zinc, cadmium, mercury and gallium; wherein $k$ equals 1, 2 or 3 depending upon the valency of M which valency in turn normally depends upon the particular group (i.e. I, II or III) to which M belongs; and wherein each R' may be any monovalent hydrocarbon radical. Examples of suitable R' groups include an aryl or alkaryl radical, aliphatic hydrocarbon radical or derivatives, such as alkyl, cycloalkylalkyl, cycloalkenylalkyl, arylalkyl, cycloalkyl, alkylcycloalkyl, arylcycloalkyl, cycloalkylalkenyl.

Specific examples of R' groups for substitution in the above formula include methyl, ethyl, n-propyl, isobutyl, n-amyl, isoamyl, hexyl, n-octyl, n-dodecyl, and the like; 2-butenyl, 2-methyl-2-butenyl and the like; cyclopentylmethyl, cyclohexylethyl, cyclopentylethyl, methylcyclopentylethyl, 4-cyclohexenylethyl and the like; 2-phenylethyl, 2-phenylpropyl, α-naphthylethyl, methylnaphthylethyl, and the like; cyclopentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl, and the like; phenylcyclopentyl, phenylcycohexyl, and the corresponding naphthyl derivatives of cycloalkyl groups, and the like; phenyl, tolyl, xylyl, ethylphenyl, xenyl, naphthyl, methylnaphthyl, dimethylnaphthyl, ethylnaphthyl, and cyclohexylphenyl.

Generally preferred, however, are the organocompounds of Groups I, II and III, such as methyl and butyllithium, pentenylsodium, dihexylmercury, diallylmagnesium, diethylcadmium, benzylpotassium, di-p-tolylmercury, diethylzinc, tri-n-butylaluminum, methyl phenylmercury, diisobutyl ethylboron, diethylcadmium, di-n-butylzinc and tri-n-amylboron, and in particular the aluminum alkyls, such as trihexylaluminum, triethylaluminum, trimethylaluminum, and in particular triisobutylaluminum.

In addition, mono-organo-halides and hydrides of Group II metals, and mono- or di-organo-halides and hydrides of Group III metals conforming to the above general formula are also suitable. Specific examples of such compounds are diisobutylaluminum bromide, isobutylboron dichloride, methylmagnesium chloride, phenylmercuric iodide, ethylberyllium chloride, ethylcalcium bromide, hexylcupric chloride, diisobutylaluminum hydride, methylcadmium hydride, diethylboron hydride, hexylberyllium hydride, dipropylboron hydride, octylmagnesium hydride, butylzinc hydride, dichloroboron hydride, dibromoaluminum hydride and bromocadmium hydride.

Also, compounds comprising a Group I, II or III metal compound complexed with a Group I metal compound if they conform to the above general formula, are generally suitable. Examples of such compounds are tetraethyllithium aluminum, tetrahexyllithium aluminum, trihexylpotassium aluminumchloride, triethyllithium aluminum bromide, tributylsodium zinc, tributyllithium zinc, trioctadecylpotassium aluminum hydride, diphenyldilithium and diphenylpotassium lithium.

Although it is appreciated that when R, in the above defined general formula, does not comprise at least one hydrocarbon radical, the Group I, II and III metal compounds of the present invention cannot normally be termed organometallic compounds, compounds lacking at least one hydrocarbon radical comprise such a relatively small number of the total number of compounds included by said general formula that for the purposes of the present invention, it is intended that these compounds be included within the generic term, organometallic compound. Accordingly, in the specification and in the claims, it is intended, and therefore it should be understood, that the term, organometallic compound, refers to all the compounds included within the scope of the above defined general formula.

Using the catalysts of this invention, polymerization of the olefinic charging stock can be accomplished in the absence of liquids, solvents or diluents, for example, in the gas phase, but it is usually desirable to effect polymerization in the presence of a substantially inert liquid reaction medium which functions as partial solvent for the monomer, a solvent for the organometallic compound, as a heat transfer agent, and/or as a liquid transport medium to remove normally solid polymerization products as a dispersion from the polymerization reactor, thus permitting efficient and continuous polymerization operations. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as propane, butane, n-pentane, n-hexane, 2,3-dimethylbutane, n-octane, isooctane, 2,2,4-trimethylpentane, n-decane, n-dodecane, cyclohexane, methylcyclohexane, dimethylcyclopentane, ethylcyclohexane, decalin, methyldecalins, dimethyldecalins and the like are suitable. Also, members of the aromatic hydrocarbon series, such as ethylbenzene, isopropylbenzene, sec-butylbenzene, t-butylbenzene, ethyltoluene, ethylxylenes, hemimellitene, pseudocumene, isodurene, diethylbenzene, isoamylbenzene, and particularly the mononuclear aromatic hydrocarbons such as benzene, toluene, xylenes, mesitylene and xylene-p-cymene mixtures, and the like are completely suitable. Aromatic hydrocarbon fractions obtained by the selective extraction of aromatic naphthas, from hydroforming operations such as distillates or bottoms, from cycle stock fractions or cracking operations, etc., and certain alkyl naphthalenes which are liquid under the polymerization reaction conditions, for example, 1-methylnaphthalene, 2-isopropylnaphthalene, 1-n-amylnaphthalene and the like, or commercially produced fractions containing these hydrocarbons and the like are also suitable.

The proportion of surface reacted particulate inorganic solid to organometallic compound utilized in preparing the catalyst is not usually a critical feature of the process. Moreover, if this proportion is expressed as a simple molar or weight ratio, it may not be particularly meaningful because, as indicated above, the efficiency of said surface reacted solids (on a weight or molar basis) is highly dependent upon the proportion of Group VIIa halide chemically combined therewith. Accordingly, in order to be most meaningful the relationship between catalyst components should be expressed as a function of the amount of Group VIIa halide which has reacted with the surface of the finely-divided solid. We have found from experience that a molar ratio of from 0.1 to 3 millimoles of the organometallic compound per milliatom of Group VIIa metal chemically combined with the surface of the finely-divided solid is to be preferred.

The quantity of catalyst i.e., comprising both the surface reacted finely-divided solid and the organometallic compound, to be utilized in the polymerization reaction may vary, the precise proportion relative to the amount of monomers used being selected in accordance with the rate of polymerization desired, the geometry of the reaction zone, the composition of the particular olefinic charging stock, temperature and other reaction variables. It should be pointed out that in general the efficiency of the catalysts of the present invention is extremely high and accordingly, the total quantity of catalyst that need be employed based on the weight of the charging stock is very small particularly when a very fine particle size oxide is utilized as the inorganic solid.

Harmful impurities in the liquid hydrocarbon reaction medium can be effectively neutralized prior to the formation therein, or addition thereto, of the catalyst or catalyst components by treating the liquid medium with a metal alkyl. The olefinic charging stocks can be purified by any known means such as bubbling said stocks through a solution of a metal alkyl in a hydrocarbon solvent prior to their introduction into the polymerization reactor.

Temperature control during the course of the polymerization process can be readily accomplished when a liquid hydrocarbon diluent is utilized because of the presence in the reaction zone of a large liquid mass having relatively high heat capacity. The liquid hydrocarbon reaction medium can be cooled by heat exchange inside or outside the reaction zone.

The contact time or space velocity employed in the polymerization process will be selected with reference to the other process variables such as the particular catalysts utilized, the specific type of product desired, and the extent of olefin conversion desired in any given run or pass over the catalyst. In general, this variable is readily adjustable to obtain the desired results.

There follow a number of illustrative non-limiting examples:

Example 1

To a 2000 milliliter, three neck, glass reaction vessel equipped with a stirrer and condenser, there is added 20 grams of "Cab-O-Sil," a pyrogenic silica produced by Cabot Corporation, which has an average particle diameter of about 10 millicrons and a hydroxyl group content on the surface thereof of about 1.5 milliequivalents/grams and 1500 milliliters commercial grade n-heptane. The resulting slurry is then continuously stirred and azeotropically dried for a period of 12 hours during which time about 500 milliliters of a water/n-heptane azeotrope are distilled from the vessel. Next, there is added to said vessel about 25 millimoles of butyllithium dissolved in 250 milliliters anhydrous n-heptane. The vessel is then continuously stirred at ambient temperature for a period of about 15 minutes. Subsequently, the extent of the reaction between the butyllithium and hydroxyl groups on the surface of the silica is determined by analyzing the liquid contents of the vessel to insure the absence therein of butyllithium, and the said silica is found to have about 25 milliequivalents of lithium chemically bound to the surface thereof. Next, about 20 millimoles of manganese hexachloride dissolved in about 250 milliliters anhydrous n-heptane is added to the alkali metallated silica slurry with continuous stirring at about 50° C. After about 30 minutes, the extent of the reaction between the manganese hexachloride and the alkali metallated silica is determined by testing the liquid contents of the vessel for the absence therein of manganese hexachloride and by analyzing the solid contents of the vessel for lithium chloride and the said silica is found to have 20 milliatoms of manganese chemically bound to the surface thereof. 75 milliliters of this slurry containing about 1 gram of silica to which there is chemically bound about 1 milliatom of manganese is then transferred from this reaction vessel to a one-gallon stainless steel autoclave, equipped with a stirrer and previously flushed with dry nitrogen. Next, about 1900 milliliters of anhydrous n-heptane and about three millimoles of triisobutylaluminum are introduced into said autoclave and the autoclave is then continuously agitated and heated to, and maintained at, about 95° C. After about 10 minutes, ethylene gas is introduced into said vessel to a total pressure of about 1400 p.s.i.g. and said pressure is then maintained for three hours by periodic introduction, as needed, of additional ethylene gas. Upon examination of the products of the reaction, it is found that about 75 grams solid polyethylene has been produced.

Example 2

This example is essentially a duplicate of Example 1, with the exception that in this example azeotropic distillation of the silica/commercial grade n-heptane slurry is not carried out. 30 minutes after the addition of the manganese hexachloride as described in Example 1, the silica is analyzed and it is found that there is no manganese chemically bound to the surface thereof.

Obviously, many changes can be made in the above description, examples and procedures without departing from the scope of the present invention. Thus, for example, the catalyst components of the present invention instead of being treated with an organometallic compound such as triisobutylaluminum as in Example 1, can be subjected to ultraviolet radiation or reacted with a silane such as trimethoxysilane-$(CH_3O)_3SiH$ in order to produce catalytically active products useful as catalysts for polymerization. Also, for example, although only manganese hexachloride is mentioned in the above examples, other Group VIIa halides as set forth above in detail are also suitable.

Also, although only an alkali metal alkyl is specifically mentioned in the above examples, alkali metals and alkali metal hydrides (i.e. lithium hydride, potassium hydride, cesium hydride, etc.) are also suitable for the purposes of the present invention.

Also, pyrogenically coformed, or coprecipitated metal oxides, or metal oxides coformed with, or mixed with, other compounds are suitable for the purposes of the present invention, although pyrogenically formed and coformed oxides are definitely preferred. It is pointed out that it is intended, and it should therefore be understood, that for the purposes of the present specification and the claims appended hereto, the term, metal oxide, includes silica.

Accordingly, it is intended that the above disclosure be regarded as illustrative and as in no way limiting the scope of the invention.

What we claim is:

1. A process for producing a polymerization catalyst component which comprises reacting (a) a finely-divided metal oxide having an average particle diameter of less than about 0.1 micron and bearing in chemical combination on the surface thereof at least about $1 \times 10^{-4}$ gram atoms per gram of alkali metal which is chemically bonded directly to an oxygen atom in the surface of said oxide, with (b) a compound conforming to the formula $$ZO_aX_b$$

wherein Z is a metal of Group VIIa; O is oxygen; $a$ is a number from 0 to 1; each X is any halogen; $b$ is a number from 1 to 6; and wherein Z is chemically linked directly to an oxygen atom in the surface of said oxide.

2. The process of claim 1 wherein said alkali metal chemically bound to the surface of said oxide is lithium.

3. The process of claim 1 wherein said alkali metal chemically bound to the surface of said oxide is sodium.

4. The process of claim 1 wherein said alkali metal chemically bound to the surface of said oxide is potassium.

5. The process of claim 1 wherein said oxide is chosen from the group consisting of alumina and silica.

6. The process of claim 1 wherein said oxide is chosen from the group consisting of alumina and silica having an average particle diameter of less than about 0.05 micron and wherein said oxide has chemically bound thereto at least about $5 \times 10^{-4}$ gram atoms per gram of an alkali metal.

7. The process of claim 1 wherein in said formula:

$$ZO_aX_b$$

Z is manganese.

8. The process of claim 1 wherein in said formula:

$$ZO_aX_b$$

Z is manganese, $a$ is 0 and each X is chlorine.

9. A finely-divided metal oxide having an average particle diameter of less than about 0.1 micron and carrying in chemical combination at least $1 \times 10^{-4}$ equivalents per gram of surface structures conforming to the formula:

$$ZO_aX_b$$

wherein Z is a metal of Group VIIa; O is oxygen; $a$ is a number of 0 to 1; each X is any halogen; $b$ is a number from 1 to 5 and wherein Z is linked directly to at least one oxygen atom in the surface of said oxide.

10. The metal oxide of claim 9 wherein said oxide is chosen from the group consisting of silica and alumina.

11. The oxide of claim 9 wherein in the formula $$ZO_aX_b$$

Z is manganese.

12. The oxide of claim 9 wherein in the formula $$ZO_aX_b$$

each X is chlorine.

13. The oxide of claim 9 wherein in the formula $$ZO_aX_b$$

$a$ is 0.

14. A process for producing a polymerization catalyst which comprises reacting (a) a finely-divided metal oxide having an average particle diameter of less than about 0.1 micron and bearing in chemical combination on the surface thereof at least about $1 \times 10^{-4}$ equivalents per gram of alkali metal which is chemically linked directly to an oxygen atom in the surface of said oxide with (b) a compound conforming to the formula $$ZO_aX_b$$

wherein Z is a metal of Group VIIa; O is oxygen; $a$ is a number from 0 to 1; each X is any halogen; $b$ is a number from 1 to 6; and wherein Z is chemically linked directly to at least one oxygen atom in the surface of said oxide and subsequently combining the resultant Group VIIa bearing oxide with a compound conforming to the general formula $$MM'_vX_nR_y$$

wherein M is chosen from the group consisting of the metals of Groups I, II and III; M' is a metal of Group I; $v$ is a number from 0 to 1; each X is any halogen; $n$ is a number from 0 to 3; each R is chosen from the group consisting of any monovalent hydrocarbon radical and hydrogen; and $y$ is a number from 1 to 4.

15. The process of claim 14 wherein in the formula $$ZO_aX_b$$

$a$ is 0.

16. The process of claim 14 wherein in the formula $$ZO_aX_b$$

each X is chlorine.

17. The process of claim 14 wherein in the formula $$ZO_aX_b$$

Z is manganese.

18. The process of claim 14 wherein in the general formula:

$$MM'_vX_nR_y$$

M is aluminum, $v$ is 0, $n$ is 0, and each R is any alkyl group.

19. The process of claim 14 wherein said oxide is chosen from the group consisting of silica and alumina.

20. A polymerization catalyst which comprises
(a) a finely-divided metal oxide having an average particle diameter of less than about 0.1 micron and bearing in chemical combination on the surface thereof at least about $1 \times 10^{-4}$ equivalents per gram of structures conforming to the formula $$ZO_aX_b$$

wherein Z is a metal of Group VIIa; O is oxygen; $a$ is a number from 0 to 1; each X is any halogen; $b$ is a number from 1 to 5; and wherein Z is chemically linked directly to an oxygen atom in the surface of said oxide and,
(b) a compound conforming to the general formula $$MM'_vX_nR_y$$

wherein M is chosen from the group consisting of the metals of Groups I, II and III; M' is a metal of Group I; $v$ is a number from 0 to 1; each X is any halogen; $n$ is a number from 0 to 3; each R is chosen from the group consisting of any monovalent hydrocarbon radical and hydrogen; and $y$ is a number from 1 to 4.

21. The catalyst of claim 20 wherein the oxide is chosen from the group consisting of silica and alumina.

22. The catalyst of claim 20 wherein in the formula $$MM'_vX_nR_y$$

$v$ is 0 and $n$ is 0.

23. The catalyst of claim 20 wherein in the formula $$MM'_vX_nR_y$$

M is aluminum, $v$ is 0, $n$ is 0 and each R is any alkyl group.

24. The catalyst of claim 20 wherein in the formula

$a$ is 0.

25. The catalyst of claim 20 wherein each X in said surface structures is chlorine.

26. The catalyst of claim 20 wherein in the formula

Z is manganese and each X is chlorine.

References Cited by the Examiner

UNITED STATES PATENTS

| | | | |
|---|---|---|---|
| 2,272,711 | 2/42 | Hull | 252—441 |
| 2,284,981 | 6/42 | Martin et al. | 252—441 |
| 2,399,488 | 4/46 | Hearne | 252—441 |
| 2,402,847 | 6/46 | Schmerling et al. | 252—441 |
| 2,454,227 | 11/48 | Smith et al. | 252—434 |
| 2,813,837 | 11/57 | Holden | 252—441 |
| 2,828,347 | 3/58 | Hogan et al. | 252—441 |
| 2,833,832 | 5/58 | Fox | 252—441 |
| 2,909,512 | 10/59 | Bruce | 252—429 |
| 2,980,662 | 4/61 | Jezl | 252—429 |
| 2,980,744 | 4/61 | Voltz | 252—429 |
| 2,999,074 | 9/61 | Bloch et al. | 252—441 |
| 3,085,999 | 4/63 | Tung | 252—429 |
| 3,105,066 | 9/63 | MacKenzie | 252—429 |

FOREIGN PATENTS 823,024  11/59  Great Britain.

TOBIAS E. LEVOW, *Primary Examiner.*